United States Patent Office 3,012,050
Patented Dec. 5, 1961

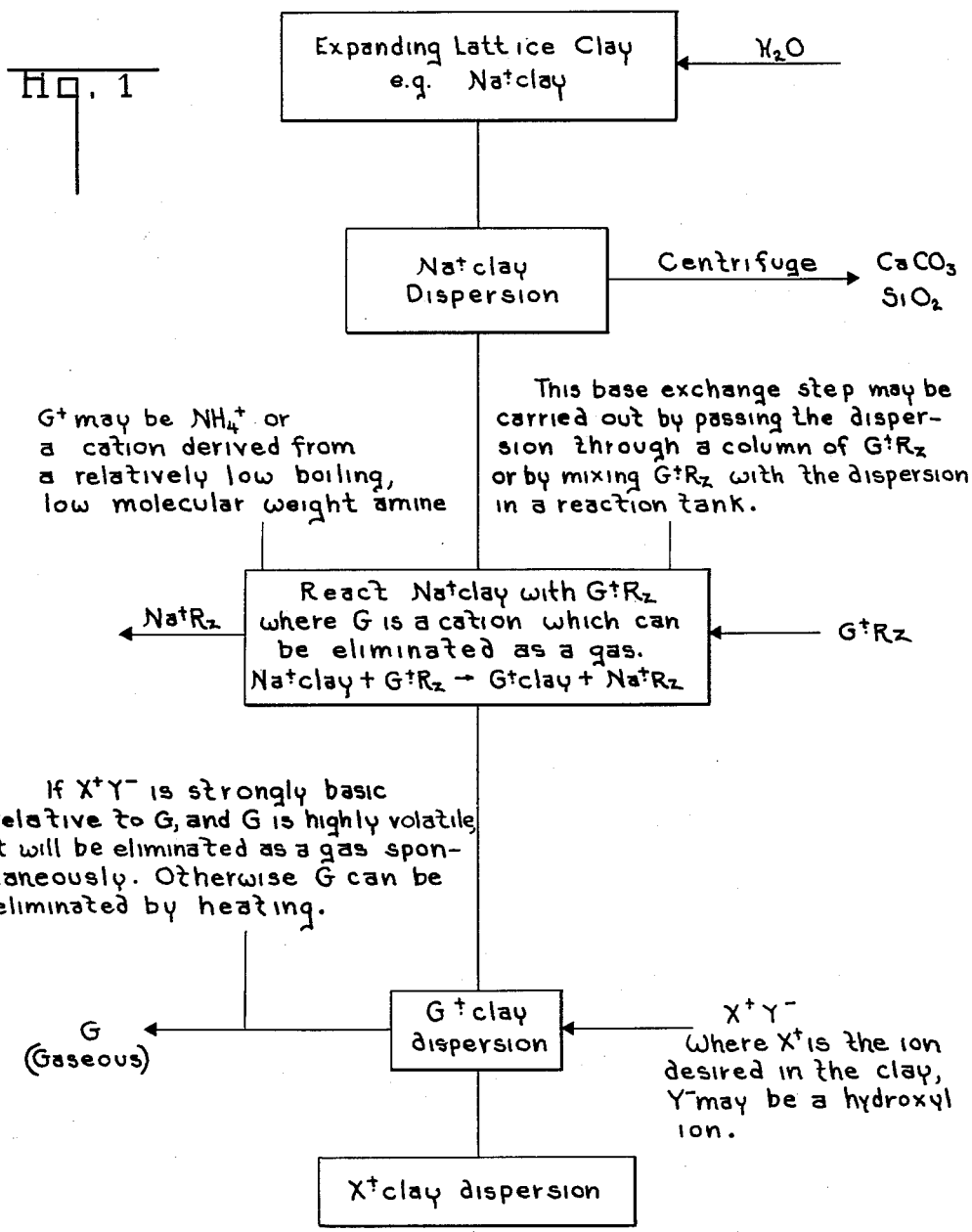

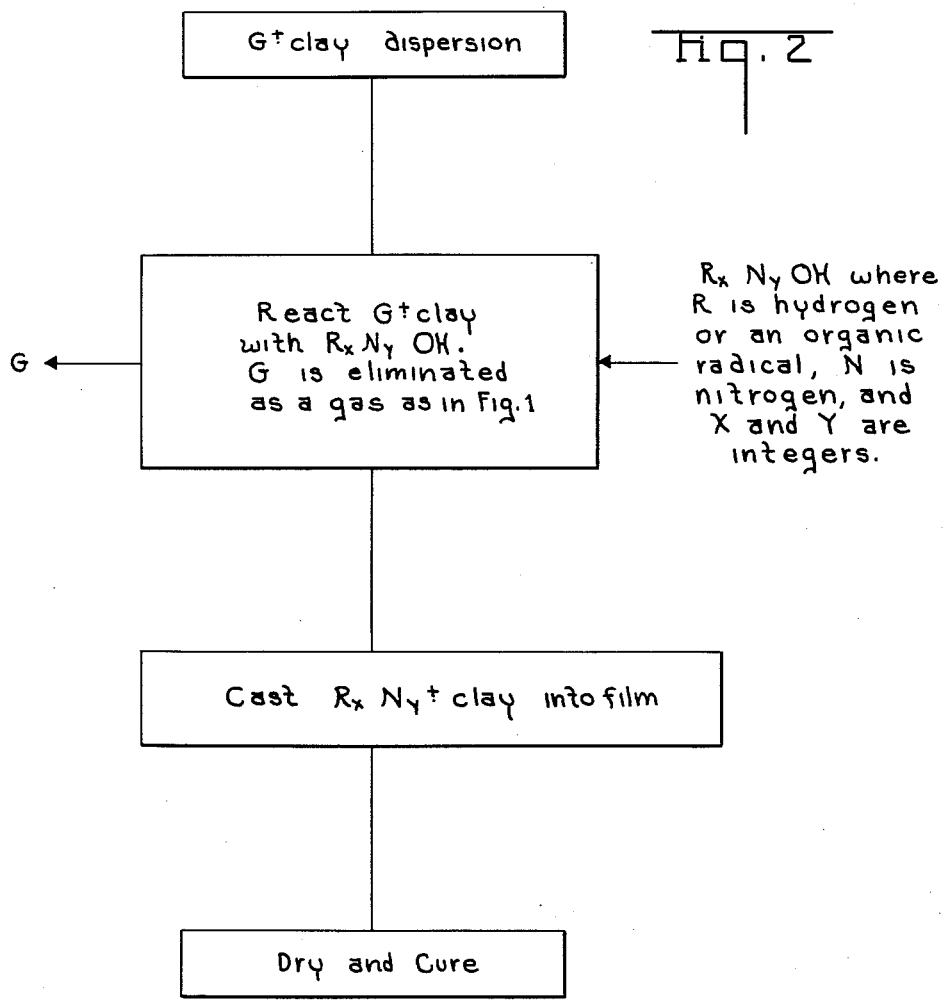

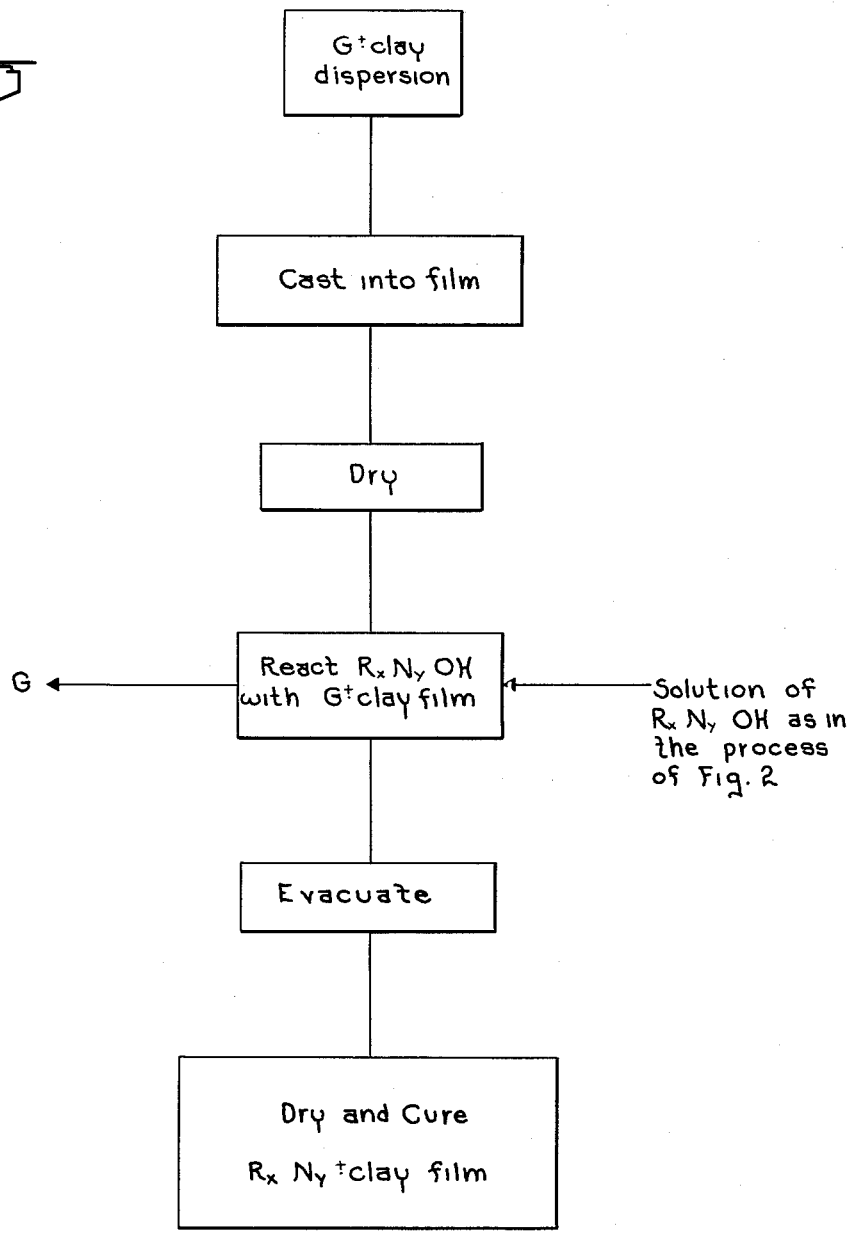

3,012,050
CLAY TREATMENT
Harry A. Fox, Jr., Harrisburg, Pa., George T. Kerr, Haddonfield, N.J., and Richard H. Zimmerman, Hershey, Pa., assignors to AMP Incorporated, Harrisburg, Pa.
Filed July 18, 1958, Ser. No. 749,540
15 Claims. (Cl. 260—448)

This invention relates to the treatment of clays having an expanding lattice and to the product produced by the treatment of such clays. This application is a continuation-in-part of the co-pending application of Harry A. Fox, George T. Kerr and Richard H. Zimmerman, Serial No. 594,189, filed June 27, 1956, now abandoned for Clay Treatment.

The term "expanding lattice clay" is understood to refer to a clay having particles composed of stacked unit layers or plates of atoms and containing exchangeable metallic ions between these plates, see Grim, Clay Mineralogy, McGraw-Hill, New York, 1953, pp 55–57. For example, each particle of a bentonite or hectorite clay consists of plates or unit layers having metallic ions, usually sodium and/or calcium ions, interposed between the plates. Water or certain other polar molecules will enter these clay particles by virtue of the attractive force of the metallic ions and cause the clay particles to expand as the plates are pushed apart by the polar molecules. The ability of the bentonites to form plastic hydrogels is attributable to this phenomenon.

Under some circumstance, it is desirable to replace the $Na^+$, $Ca^{++}$ or other exchangeable cations in an expanding lattice clay by different cations. For example, such clays are useful as thickening agents and, when used for this purpose, the naturally occurring cations are frequently replaced by organic cations as disclosed in U.S. Patent 2,767,176. As a further example, the U.S. patent to Hauser No. 2,266,636 discloses a method of forming a film by preparing a dispersion of an expanding lattice clay, spreading a layer of the dispersion over a smooth surface, and drying the resulting film. The properties of such films can be improved if the naturally occurring exchangeable cations are replaced by certain other cations such as other metallic ions, complex metallic ions, and large organic ions. Where the film is used as a dielectric, the replacement of the naturally occurring cations by relatively large organic cations capable of polymerizing to form long inter-plate (i.e. extending between the unit layers) chains is highly beneficial in that the power factor of the film can be reduced. One suitable ion for this purpose is formed when diethylenetriamine is reacted with phthalic anhydride in aqueous solution.

In one commonly known prior art method of exchanging the $Na^+$ or $Ca^{++}$ ions of the expanding lattice clay, the clay is contacted with a solution, referred to as an impregnant, containing the cations desired in the clay. For example, where a thickening agent is desired, a dispersion of the clay is prepared and a solution containing the desired ion is admixed with this dispersion. Where a film is desired, as disclosed in the Hauser patent, it has, heretofore, been the practice to form the film with the naturally occurring cations at the cation exchange sites in the clay and then immerse the film in a solution containing the cation desired. The cation exchange reaction for this process can be represented as follows, assuming in the interest of simplicity that there are only $Na^+$ ions present:

$Na^+ \cdot clay + $ other $ion^+ \rightarrow $ other $ion^+ \cdot clay + Na^+$

This prior art process is satisfactory in many respects however, it is subject to certain disadvantages. For example, as the concentration of reaction products (in the form of other $ion^+ \cdot clay + Na^+$) increases, the speed of the reaction decreases and the reaction will come substantially to a halt with some of the reactants (in the form of $Na^+ \cdot clay + $ other $ion^+$) unused. In other words, equilibrium may be reached before the $Na^+$ ions have been substantially replaced by the other ions. This retardation of the process by the attainment of equilibrium takes place whether the clay is treated in bulk as a dispersion or after it has been formed into a film. The prior art process is thus wasteful of the impregnant solution since the solution is only partially used before it must be discarded. The clay or clay film can be treated repeatedly with fresh impregnant in order to achieve a more complete cation exchange but such a course is wasteful, time consuming and expensive.

A further disadvantage of the prior art process is that when clay film is being treated, the film must be handled repeatedly when it is immersed in the impregnant and such handling must be done carefully because of the fragile nature of the film. This fact materially increases the cost of producing dielectric film from expanding lattice clays.

An object of the present invention is to provide improved methods of producing base exchanged clays and clay products which methods avoid some recognized difficulties of the prior art methods. Particularly, an object of the invention is to provide a method of base exchanging clays which avoids prior art difficulties arising from equilibrium phenomena.

A further object is to provide base exchange clays and clay products in which a high percentage of naturally occurring ions have been replaced by other ions.

A still further object of the invention is to provide an improved dielectric film of the type produced from expanding lattice clay.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a flow sheet illustrating the invention in a broad aspect;

FIGURE 2 is a flow sheet illustrating one application of the invention to the manufacture of dielectric film; and FIGURE 3 is a flow sheet illustrating another application of the invention to the manufacture of dielectric film.

According to the present invention, the naturally occurring exchangeable cations in the clay are exchanged in a first cation exchange step for a cation herein referred to as an "intermediate" cation, which can be exchanged for the naturally occurring ions with relative ease and which can be eliminated by volatilization. This intermediate cation is then exchanged for the final cation desired in the clay and the intermediate cation is eliminated by volatilization. The term "eliminated by volatilization" is intended to mean that the intermediate cation undergoes a valence or other change and is eliminated as a gas. This feature of the invention is highly advantageous as compared with the prior art process since $Na^+$ or $Ca^{++}$ ions in the clay can not be eliminated in gaseous form. Furthermore, the intermediate cation may be eliminated during the exchange of this cation for the final cation desired in the clay so that one of the reaction products of this cation exchange step is continuously removed as the reaction proceeds, and the reaction is permitted to go further toward completion than would be the case if it were slowed down by the attainment of equilibrium.

A suitable intermediate cation is the ammonium ion since it will replace the $Na^+$, $Ca^{++}$ ions in the clay with relative ease, for example, by contacting the clay with a cation exchange resin in its ammonium form. Furthermore, the ammonium ion is readily eliminated by volatilization as ammonia after it has been replaced by the final ion desired in the clay. An ion other than the ammonium ion might be employed as the intermediate cation, for example, an ion derived from a relatively low molecular weight, low boiling point amine such as the ion, $CH_3NH_3^+$, derived from methyl amine.

The final cations may be metallic ions, complex metallic ions, or organic cations larger than the naturally-occurring cations. These cations will also tend to take the place of any of the original cations still present in the clay, and thus reduce the content of the original cations still further. Preferably these cations are derived from an amine of high molecular weight and high boiling point, for example, diethylenetriamine, triethanolamine, pentamethylene hexamine paradiisobutyl-phenoxy-ethoxy-ethyl-dimethyl benzyl-ammonium chloride or dimethyloctadecylamine. In practice the amines can be regarded as amine hydroxides when in solution in water. Advantageously the organic cations introduced into the clay are polymerizable, or "curable," and the clay is treated to bring about polymerization. This is of particular value when dielectric film is formed from the clay; by bringing about the polymerization or curing after the clay has been made into a film the physical and electrical properties are improved. The polymerizable cations may be derived from the reaction product of a polyamine and a polycarboxylic acid and are preferably derived from the reaction product of triethanolamine or diethylenetriamine and phthalic anhydride. Also, good results have been obtained with a mixture of the reaction product of triethanolamine and phthalic anhydride and the reaction product of diethylenetriamine and phthalic anhydride. Such reaction products can be considered as polyfunctional amine salts. These cations derived from the reaction product of diethylenetriamine or triethanolamine and phthalic anhydride can be polymerized or cured by heating to 240 to 250° C.

It is believed that the mechanism of elimination of the intermediate cation is not exactly the same in all situations and depends upon several factors, particularly the chemical natures of the intermediate cation and the final cation and the conditions under which the process is carried out. The intermediate cation should be capable of elimination as a gas under the conditions of temperature and pressure existing during the practice of the process, and ordinarily these conditions will be those of room temperature and atmospheric pressure. The ammonium ion can be eliminated under such conditions, as also can the ion, $CH_3NH_3^+$ derived from methyl amine. The elimination of the intermediate cation might also take place, or be assisted by, a difference in the degree of basicity of the intermediate cation and the final cation. If the intermediate cations are the cations of a volatile base, and the final cations are the cations of a stronger base, the reaction of the stronger base on the weaker base will cause elimination of the weaker base as a gas.

To consider some specific examples, the intermediate cations may be ammonium cations and the final cations may be the cations derived from the reaction product of diethylenetriamine and phthalic anhydride. Since the final cations are the cations of a strong base, the mechanism of elimination involves the strong base—weak base reaction. Furthermore, since ammonia boils at a low temperature, elimination is assisted by this fact. Of course, if the final cations are not the cations of a relatively strong base, e.g., if the final cations are those derived from lead acrylate, elimination of the intermediate cations may be entirely dependent on the temperature effect.

Under some circumstances, elimination of the intermediate cations will take place after, rather than during, the final cation exchange step. Where the strong base, weak base relationship is not involved, for example, the intermediate and final cations may co-exist in the clay after the final cation exchange step has been carried out. Under such circumstances, the intermediate cations can be eliminated by heating the clay after the final exchange step.

For a more thorough understanding of the invention, the more specific processes shown in the flow sheets of the accompanying drawing will now be described.

THE PROCESS OF FIGURE 1

The raw clay is first dispersed in water to form a gel or dispersion, advantageously of about 4% by weight of clay. Calcium carbonate, silica and other heavy impurities are removed from the clay by centrifuging and the dispersion is then diluted to about 2–3% by weight of clay. The gel is next contacted with a source of the intermediate ion indicated as $G^+$ in FIGURE 1. Preferred intermediate ions are the ammonium ion or a substituted ammonium ion and a preferred method of effecting this first cation exchange step is by contacting the gel with a cation exchange resin in the ammonium form. This may be done for example, by passing the gel through a column of the resin or by admixing the resin in ammonium form with the gel and then separating the resin from the gel by straining or screening. Where clay having extremely low sodium content is desired, the admixing step may be repeated and the gel contacted with a second batch of the resin. Of course, the advisability of a second contacting with intermediate cation resin will be dependent upon the amount of resin used and other variables. The dispersion is then contacted with a source of the desired ion, indicated in FIGURE 1 by $X^+Y^-$, and the intermediate cation is eliminated as a gas. Depending upon the chemical nature of $X^+Y^-$, the intermediate cation $G^+$ may be eliminated by virtue of the strongly basic characteristics of $X^+Y^-$ and by virtue of the volatility of the ion $G^+$, or primarily by virtue of the volatility of $G^+$ as previously explained.

After elimination of the intermediate cation, the product is ready for use as a thickener or for other purposes.

THE PROCESS OF FIGURE 2

The starting material in the flow sheet of this type of process is G·clay, the intermediate product of the process of FIGURE 1 and is contacted with $R_xN_yOH$ where R is hydrogen or an organic radical, N is nitrogen and X and Y are integers. This impregnant may be in the form of a solution and may be the reaction product of diethylene-triamine and phthalic anhydride or other organic ions as mentioned in the examples. The impregnant solution is mixed with the dispersion, film is cast from the dispersion, and this film is dried and cured. The intermediate ion will be eliminated either during the second ion exchange step or at the time of drying and curing depending upon the relative basicity of the impregnant solution and the intermediate ion, the temperature of the reaction, and the volatility of the intermediae ion.

This process as disclosed in FIGURE 2 permits the manufacture of film of a high degree of purity (having few residual sodium ions) and moreover avoids the costly and tedious manual impregnation steps of the prior art where the sodium ion is exchanged directly for the final ion.

THE PROCESS OF FIGURE 3

In this process, the dispersion of the clay in its intermediate ion form is cast into film, dried, and the film is immersed in a reaction tank containing a solution of the final cation desired. Again, the intermediate cation will be eliminated either at the time of the reaction or during a subsequent heating step depending upon the relative basicity of the impregnant and the intermediate cation and upon the volatility of the intermediate cation. This process is advantageous as compared to the prior art process in that the final cation exchange can be carried out more easily and will go to a higher degree of completion than the reaction of the prior art process where the sodium ion is exchanged directly for the final ion desired.

Some specific examples are presented below:

Example 1

A quantity of hectorite clay was dispersed in purified water to form a dispersion containing 4% by weight of clay and permitted to hydrate for several days to form a homogeneous gel. The hectorite gel was then passed through a centrifuge twice to remove silica and calcite, after which it was diluted with additional de-ionized water to form a 2% dispersion.

A 1 cubic foot bed of a sulphonated cross-linked polystyrene cation-exchange resin (Amberlite IR 120) was prepared and treated with a 1-normal solution of ammonium chloride to convert the resin to its ammonium form. The hectorite dispersion was then passed through this ion-exchange bed at the rate of 120 lbs. per hour. It was found that with this flow rate, the sodium ions of the clay were replaced by the ammonium ions of the resin to yield an ammonium clay dispersion.

Diethylenetriamine and phthalic anhydride were dissolved in water in the proportions of 23.7% by weight of the amine and 28.4% by weight of the anhydride. 120 lbs. of the 2% dispersion from the ion-exchanger was placed in a stirring kettle and diluted with 5.5 kg. of water. 460 gms. of the diethylenetriamine-phthalic anhydride solution was added to 12.8 kilograms of water, and the diluted solution was slowly added to the clay dispersion with vigorous stirring. The rate of addition was such that approximately 1 hour was required for this addition. An additional 480 gms. of the undiluted solution of diethylenetriamine and phthalic anhydride was then added over a period of one or two minutes with continued stirring.

After addition of the solution to the dispersion, the resulting mixture was evacuated at approximately 10 mm. of mercury absolute pressure, for 45 minutes with slow stirring to remove gases therefrom. The dispersion was then cast into a film by spreading it on glass plates to a thickness of approximately 0.08". The plates were put in a drying oven at 55° to 65° C. with humidity near but above 25% for two hours, at the end of which time the film was substantially dry and about 1 mil in thickness.

After drying, the film was removed from the glass plates and cut to size, and stacked, ten to twelve sheets to a stack. These stacks were placed between blotters and permitted to stand at room temperature for 14 days. At the end of this period the sheets were put in an oven and the oven temperature raised 5° C. per hour until a temperature of 60° to 70° C. was reached, which temperature was maintained for 5 days.

After this preliminary curing treatment, the stacks of film were placed between aluminum plates and heated in an oven to a temperature in the range of 85° C. to 95° C. This temperature was maintained for 5 hours and then the temperature was increased at the rate of 5° C. per hour until a temperature of 240° to 250° C. was reached. The film was held at 240° C. to 250° C. for two to three days at the end of which time polymerization of the resin-forming ingredients (the ion formed by the diethylenetriamine and phthalic anhydride) was found to be complete.

The film as thus prepared was tested and found to have at 25° C. a loss factor of .003 and a specific inductive capacitance of 3.7. At 100° C. the loss factor was .006. Over the range of 25° C. to 100° C., the specific inductive capacitance increased at the rate of 0.015% per degree. These measurements were obtained on single sheets of film mounted in a holder and utilizing 1000 cycles per second with mercury electrodes. A General Radio (Model 716–C) capacitance bridge was used throughout this work.

Example 2

A quantity of a 2% hectorite dispersion refined according to the procedure of Example 1 was treated by passing it through a mixed bed of ion-exchange resins. The bed was composed of a mixture of 500 ml. of cation exchange resin (Amberlite IR–120) in its ammonium form and 175 ml. of anion exchange resin (IRA–400) in its OH form. The mixture of ion exchange resins was introduced into a stainless steel pipe 4–5 inches in diameter to form a mixed bed through which the dispersion was passed.

About 55 kg. of hectorite dispersion was caused to flow through the bed at an average rate of 400 ml. per minute to remove sodium from the clay and form an ammonium clay.

A solution of diethylenetriamine and phthalic anhydride was prepared as described in Example 1, and 461 gms. of the solution was diluted in 12.9 liters of water. The diluted solution was added drop-wise to the resulting dispersion over a period of about an hour. Thereafter 461 gms. of concentrated solution was added rapidly with continued stirring.

The dispersion as thus prepared was spread, dried and cured essentially in accordance with the procedure of Example 1 and the cured film tested. The film as thus prepared had a power factor of 0.61% and a dielectric constant of 3.7 at 25° C.

Example 3

Approximately 500 gms. of dispersion (2% solids content) was passed through a mixed-bed ion exchanger composed of approximately 150 gms. each of cation exchange resin (Amberlite IR–120) in ammonium form and anion exchange resin (IRA–400 in OH form). The flow rate was of the order 200–300 ml. per hour. The de-metallized dispersion was mixed with a solution as described in Example 1 and then cast into a film, dried, and cured.

The resulting film was analyzed to determine its sodium content and the sodium content of the film was found to be only 0.03% (considered as $Na_2O$).

Example 4

A 2% aqueous dispersion of hectorite was prepared and passed through a column 2" in diameter and 30" high of sulphonated polystyrene resin (Amberlite IR–120) which resin had previously been put in the ammonium form by contacting with an excess of 1 N $NH_4Cl$ solution. The resulting dispersion of clay contained 2 meq. $Na^+$ per 100 gm. of clay. The ammonium clay dispersion was admixed with a solution containing a high molecular weight amine which solution was prepared as follows: 250 ml. of a molar solution having a pH of 8 of para diisobutyl phenoxy ethoxy ethyl dimethyl benzyl ammonium chloride (commercially available as "Hyamine 1622") were passed through a column 18 inches high and ¾ inch in diameter of a strongly basic amine type anion exchange resin (Amberlite IRA–400) in OH-form to exchange the Cl-ions in the "Hyamine" for OH-ions of the resin. The pH of the resulting solution of the "Hyamine" in the hydroxide form was approximately 11.

4.5 ml. of the solution of modified Hyamine were diluted with 28 ml. of water and added dropwise with constant agitation of the reaction vessel to 200 ml. of the ammonium clay dispersion. Flocculation of the clay immediately started and ammonia fumes heretofore absent were clearly detected. Also moistened litmus paper positioned above the vessel turned blue, probably because the $NH_3$ formed $NH_4OH$ on the litmus paper.

The flocculant was separated from the solution by vacuum filtration and the filtrate was dried in an oven at 50° C. for 24 hours. The resulting modified clay was slightly darker than the original hectorite clay.

*Example 5*

A 5 percent aqueous dispersion of Wyoming bentonite having a base exchange capacity of 100 meq. of cation per 100 gm. of dry clay was prepared and passed through a column two inches in diameter and 30″ high which contained sulphonated polystyrene resin (Amberlite IR 120) which resin has previously been modified to the ammonium form by contacting with an excess of 1 N $NH_4Cl$ solution. The resulting dispersion of clay which contained 0.22 meq. of $Na^+$ ion per 100 gm. of clay, was admixed with a solution containing a high molecular weight amine, which amine solution was prepared as follows:

Dimethyloctadecyl amine (commercially available as "Armeen DM1 8D" from Armour and Company) was dissolved in diethyl ether, in the weight ratio of about two parts of ether to each part of amine. The solution was warmed to a temperature of about 45° C. and an excess of methyl bromide gas was bubbled therethrough to produce trimethyloctadecyl ammonium bromide, a salt which is insoluble in ether. The salt was then washed with fresh ether and filtered. Thereafter the salt was dried by evaporation of the ether. An analysis of the resulting salt by the Parr Bomb method showed that the percentage of bromide ion in the salt was within one percent of the theoretical quantity for trimethyloctadecyl ammonium bromide.

A 1 N aqueous solution of the bromide was prepared and 100 ml. of this solution was passed through a column 18″ high and ¾″ in diameter which contained a strongly basic amine type anion exchanger (Amberlite IRA 400 in the OH form) to exchange the bromide ions of the salt for the hydroxide ions of the resin. The resulting solution of amine hydroxide was strongly basic and free of bromide ions.

To a measured quantity of the 5% bentonite dispersion in the $NH_4^+$ form was added dropwise, and with stirring, a sufficient quantity of the amine hydroxide solution to satisfy the cationic base exchange capacity of the clay. Flocculation occurred as the $NH_4^+$ ions in the bentonite were replaced by the cationic amine of the hydroxide. The odor of ammonia was clearly detectable and moistened litmus paper positioned above gave the reaction indicating a gaseous base. The flocculated clay was collected on a filter and excess water was removed. No washing was necessary. After air drying the resulting modified clay was found to have swelling properties in non-polar organic solvents such as benzine and toluene.

*Example 6*

A quantity of hectorite clay having about 75 meq. of sodium per 100 gm. of dry clay was dispersed in purified water to form a dispersion containing 4% by weight of clay and permitted to hydrate for several days to form a homogeneous gel. The hectorite gel was then passed through a centrifuge twice to remove silica and calcite, after which it was diluted with additional purified water to form a 2.5% gel.

Approximately 226 kg. of this 2.5% gel was placed in a tank containing 1.5 cu. feet of sulphonated polystyrene cation exchange resin (Amberlite IR-120) in the ammonium form. The mixture was stirred vigorously for fifteen minutes and the resin was then separated from the clay gel by straining through a stainless steel screen. This operation was then repeated using fresh resin in the ammonium form. After separation of the gel from the second batch of resin, the clay was found upon analysis to have 5.95 meq. (milliequivalents) of sodium per 100 gm. of dry clay. 89 kg. of the gel was then diluted with 45 pounds of purified water to form 109 kg. of a 2.0% gel which was charged into a glass walled tank equipped with an anchor-type variable speed stirrer.

A solution of impregnant was prepared by adding phthalic anhydride and triethanolamine to water in the proportions of 3 moles of the anhydride to 2 moles of triethanolamine and an amount of water equal to the total weight of the triethanolamine and phthalic anhydride. The solution was stirred until the anhydride was entirely dissolved. 2,340 gm. of this impregnant was added to the 109 kg. of the 2.0% gel in the glass walled tank referred to above. The addition was made over a time interval of about 30 minutes by means of a siphon and the gel stirred during the addition. The gel was observed to thicken during the addition when about 50% of the impregnant had been added. Then the consistency became thinner after about 80% of the impregnant solution was added.

The reaction tank was then sealed and a vacuum of 25 in. of Hg applied thereto for about 60 minutes. Stirring was continued during this step at a rate of about 100 r.p.m.

The gel was then cast into film by pouring over glass plates. The thickness of the film was held to 67 mils by means of a spreading bar under which the plates were passed. The plates were then placed in an oven having a controlled temperature which ranged from 130° F. to 150° F. and dried. The dried film was stripped from the glass plates and single sheets of the film were placed between stainless steel plates which were charged into curing ovens. The film was cured by heating to 90° C. and maintaining this temperature for 24 hours. The temperature of the ovens was then raised at the rate of 5° C. per hour from 90° C. to 240° C. The oven temperature was held at 240° C. for 72 hours by the end of which time the film was cured.

The finished cured film had an average thickness of 1.2 mils. The electrical properties (averages of ten readings) were as follows:

Capacitance _____micro-micro farads__ 752
Power factor_____percent__ 0.63
A.C. breakdown voltage_____k.v. (R.M.S.)__ 6.3

*Example 7*

An ammonium gel containing 2.5% clay was prepared as described in the first two paragraphs of Example 6. The clay in this case had 5.73 meq. of sodium per 100 gm. of dry clay after the second treatment with cation exchange resin in the ammonium form.

The impregnant was prepared by reacting equimolar quantities of triethanolamine and phthalic anhydride in an amount of water equal to the total weight of the triethanolamine and the phathalic anhydride. 2,340 gm. of the impregnant solution was added to 109 kg. of the 2.0% gel as described in Example 6 and film was cast, dried and cured as described in Example 6.

The finished film had an average thickness of 1.2 mils. Its electrical properties (average of ten readings) were as follows:

Capacitance _____micro-micro farads__ 755
Power factor_____percent__ 0.44
A.C. voltage breakdown strength___k.v. (R.M.S.)__ 7.96

*Example 8*

3500 gm. of the impregnant solution prepared for Example 7 was added to 109 kg. of the 2.0% gel prepared for Example 7 and film was cast, dried, and cured as described in Example 6.

The finished film had an average thickness of 1.4 mils.

Its electrical properties (average of ten readings) were as follows:

Capacitance _____ micro-micro farads__ 608
Power factor_____ percent__ .36
A.C. voltage breakdown strength____k.v. (R.M.S.)__ 6.7

*Example 9*

An ammonium gel containing 2.5% clay by weight was prepared as in Example 6. The gel was evacuated, cast onto glass plates to form a film, and dried in an oven having a controlled temperature which ranged from 130° F. to 150° F.

An impregnant solution was prepared by dissolving diethylenetriamine and phthalic anhydride in water. The molar proporties were 1.06 moles of the amine and 1.00 mole of the anhydride. The total weight of the amine plus the anhydride was 55% of the weight of the solution and the water constituted 45% by weight of the solution.

The film was stripped from the glass plates and placed, one piece at a time, in the solution. The solution was maintained in a temperature range of 60° C. to 70° C. for 24 hours. The sheets of film were then transferred, piece by piece, to fresh solution. The sheets were left in this fresh solution for twenty-four hours during which the temperature was maintained in the 60–70° C. range.

The film was then removed from the impregnant and washed one sheet at a time. Each sheet was then placed between two blotters, and dried for ten days at room temperature. Thereafter the sheets were stacked, about twenty sheets to a stack, the stacks placed between aluminum sheets, and placed in curing oven. The film was cured by the curing cycle of Example 1.

Film from the batch had the following properties: Thickness—0.9 mil to 1.2 mils, average capacitance—750 micro-micro farads, A.C. voltage breakdown strength—6 to 8 k.v. (R.M.S.), and power factor range—0.2% to 0.4%.

*Example 10*

An ammonium gel containing 2.0% clay by weight was prepared as in Example 6. The gel had 3.03 meq. of sodium per 100 gm. of dry clay after the second contacting of the gel with ammonium resin.

A triethanolamine impregnant was prepared by reacting 1.1 moles of triethanolamine and 1.0 mole phthalic anhydride in an amount of water equal to the combined weight of the triethanolamine and the phthalic anhydride. A diethylenetriamine impregnant was prepared by reacting 1.1 moles of diethylenetriamine with 1.0 mole of phthalic anhydride in an amount of water equal to the combined weight of the diethylenetriamine and phthalic anhydride. A mixture of these two impregnants was prepared by combining 1990 gm. of the triethanolamine impregnant and 277 gm. of the diethylenetriamine impregnant in 11.3 kg. of water. This impregnant solution was added to 109 kg. of the 2.0% ammonium gel in a glass walled tank, and the contents mixed and evacuated as described in Example 6. The gel was then cast into film, and the film was dried, stripped and cured as described in Example 6.

The finished film had an average thickness of 1.2 mils and had the following electrical properties (averages of ten readings):

Capacitance _____ micro-micro farads__ 674
Power factor_____ percent__ 0.35
A.C. voltage breakdown strength____k.v. (R.M.S.)__ 6.7

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:
1. The method of replacing the naturally occurring exchangeable cations in an expanding lattice clay comprising the steps of, contacting a dispersion of said clay with a cation exchange material containing intermediate exchangeable cations which are volatile at a given temperature in the presence of a strong base, said intermediate exchangeable cations being selected from the group consisting of ammonium ions and substituted ammonium ions, thereby to replace the naturally occurring exchangeable cations in said clay by cations selected from said group, and subsequently contacting said clay with a basic solution containing an amine which is non-volatile at said given temperature thereby to replace said intermediate cations with cations derived from said amine while eliminating said intermediate cations selected from said group as a gas.

2. The method set forth in claim 1 where said intermediate cations comprise ammonium cations.

3. The method set forth in claim 1 wherein said clay is bentonite.

4. The method set forth in claim 1 wherein said clay is hectorite.

5. The method of replacing the exchangeable cations in an expanding lattice clay comprising the steps of, contacting a dispersion of said clay with a cation exchange material, the exchangeable cations of which are ammonium ions, thereby to replace exchangeable cations in said clay by ammonium ions, and sugsequently contacting said clay with a basic solution containing an amine, thereby to replace said ammonium ions by the cations derived from said amine.

6. In the method of making film from an expanding lattice clay, the improvement comprising the steps of contacting a dispersion of the clay with a cation exchange material containing intermediate cations which are volatile at a given temperature in the presence of a strong base, said intermediate exchangeable cations being selected from the group consisting of ammonium ions and substituted ammonium ions, thereby to replace the naturally occurring exchangeable cations in said clay by said intermediate cations, separating the resulting "second" dispersion from the cation exchange material and mixing it at said given temperature with a basic solution containing an amine which is non-volatile at said given temperature, thereby to replace said intermediate cations by cations derived from said amine while eliminating said intermediate cations as a gas, forming a film of the resulting "third" dispersion and drying and curing said film.

7. The method as set forth in claim 6 wherein said intermediate cations comprise ammonium ions.

8. The method as set forth in claim 6 wherein said clay is bentonite.

9. The method as set forth in the claim 6 wherein said clay is hectorite.

10. In the method of making film from clay, the improvement comprising the steps of: contacting a dispersion of hectorite with a cation exchange material containing exchangeable ammonium ions thereby to replace the exchangeable cations in said hectorite by ammonium ions, separating the resulting "second" dispersion from the cation exchange material and mixing with it a basic solution containing an amine thereby to replace the ammonium ions with a cation derived from said amine, eliminating said ammonium ions by volatilization, forming a film of the resulting "third" dispersion and drying and curing said film.

11. In the method of making films from aqueous dispersions of expanding lattice clays the improvement comprising the steps of, contacting a dispersion of the expanding lattice clay with a cation exchange material containing intermediate cations which are volatile at a given temperature in the presence of a strong base, said intermediate cations being selected from the group consisting of ammonium ions and substituted ammonium ions, thereby to replace the naturally occurring cations in said clay by said intermediate cations, separating the resulting "second" dispersion from the cation exchange material, forming a film of said "second" dispersion, and immersing said film in a basic solution at said given temperature containing an amine, said amine being non-volatile at said given temperature, thereby to replace said intermediate cations with cations derived from said amine and to eliminate said intermediate cations as a gas.

12. The method as set forth in claim 11 wherein said intermediate cations comprise ammonium ions.

13. The method as set forth in claim 12 wherein said clay is bentonite.

14. The method as set forth in claim 13 wherein said clay is hectorite.

15. In the method of making films from aqueous dispersions of clays, the improvement comprising the combination of steps: contacting a dispersion of hectorite with a cation exchange material containing exchangeable ammonium ions thereby to replace the exchangeable cations in said clay by ammonium ions, separating the resulting "second" dispersion from the cation exchange material, forming a film of said second dispersion, immersing said film in a basic solution containing an amine thereby to replace said ammonium ions with a cation derived from said amine while eliminating said ammonium ions by volatilization, and subsequently drying and curing said film.

References Cited in the file of this patent

UNITED STATES PATENTS

| | | |
|---|---|---|
| 2,106,522 | Ellis | Jan. 25, 1938 |
| 2,383,647 | Hauser | Aug. 28, 1945 |
| 2,576,045 | Robinson et al. | Nov. 20, 1951 |
| 2,622,987 | Ratcliffe | Dec. 23, 1952 |
| 2,641,587 | Nordlander et al. | June 9, 1953 |